United States Patent
Peeters et al.

(10) Patent No.: US 8,665,093 B2
(45) Date of Patent: Mar. 4, 2014

(54) ANTI THEFT ELECTRONIC APPARATUS

(75) Inventors: Michael M. P. Peeters, Tourinnes-la-Grosse (BE); Jan L. R. M. Taelman, Barine-le-Chateau (BE); Frank C. H. Daems, Rotselaar (BE); Veroni Ballet, Lubbeek (BE)

(73) Assignee: NXP B.V., Eindhoven (NL)

( * ) Notice: Subject to any disclaimer, the term of this patent is extended or adjusted under 35 U.S.C. 154(b) by 788 days.

(21) Appl. No.: 12/597,148

(22) PCT Filed: Apr. 29, 2008

(86) PCT No.: PCT/IB2008/051656
§ 371 (c)(1),
(2), (4) Date: Oct. 22, 2009

(87) PCT Pub. No.: WO2008/135909
PCT Pub. Date: Nov. 13, 2008

(65) Prior Publication Data
US 2010/0117834 A1    May 13, 2010

(30) Foreign Application Priority Data
May 4, 2007  (GB) .................................. 0708719.0

(51) Int. Cl.
G08B 13/14 (2006.01)
B65B 1/30 (2006.01)

(52) U.S. Cl.
USPC .................. 340/572.4; 340/752.1; 340/572.7; 141/94; 141/104

(58) Field of Classification Search
USPC .......... 340/572.1, 572.3, 572.4, 572.5, 572.8, 340/426.11, 426.13, 10.2, 572.7; 455/410, 455/411, 456.4, 569.2; 701/1; 361/679, 361/728; 141/94, 104, 235, 237
See application file for complete search history.

(56) References Cited

U.S. PATENT DOCUMENTS

| | | | |
|---|---|---|---|
| 5,081,446 A * | 1/1992 | Gill et al. | 340/572.5 |
| 5,731,957 A * | 3/1998 | Brennan | 361/728 |
| 6,898,489 B1 | 5/2005 | Hayes, Sr. | |
| 7,734,315 B2 * | 6/2010 | Rathus et al. | 455/569.2 |
| 7,845,375 B2 * | 12/2010 | Dorney | 141/94 |
| 8,151,832 B1 * | 4/2012 | Dorney | 141/94 |
| 2005/0151629 A1 | 7/2005 | Simoneau | |
| 2011/0136469 A1 * | 6/2011 | Rathus et al. | 455/410 |

FOREIGN PATENT DOCUMENTS

CN      268949      3/2005

OTHER PUBLICATIONS

Lahiri, S.; "RFID: A Technology Overview Internet Citation"; XP003015347; Retrieved on Jan. 1, 2007 from URL: http://www.informit.com/articles/article.asp?p=413662&rl=1>.
International Search Report, PCT/IB2008/051656, Apr. 29, 2008.

* cited by examiner

*Primary Examiner* — Van T. Trieu

(57) ABSTRACT

An electronic apparatus comprises a main apparatus portion, a unique identification device for attachment in close proximity to the main apparatus portion and an interrogation system provided as part of the main apparatus portion for wirelessly interrogating the identification device such that the main apparatus portion function is enabled only when in close proximity to the identification device. The identification device is adapted to be made disfunctional by detachment or attempted detachment. In this arrangement, the main apparatus portion is the normal electronic apparatus to be protected from theft. It is provided with an interrogation system so that it can be made to cease functioning if not in close proximity to the identification device.

6 Claims, 1 Drawing Sheet

ANTI THEFT ELECTRONIC APPARATUS

This invention relates to electronic apparatus which is to be protected against theft.

BACKGROUND OF THE INVENTION

Although prices of electronic apparatus are falling, an increasing number of everyday items are being designed with in-built microprocessors, and with smaller and smaller sizes. As a result, the range and quantity of goods taken during a typical burglary have an increasing value. The need to protect devices from theft by rendering them inactive after being stolen has been widely recognised.

One common example of this is the face-off in-car music system, in which the front panel is removed from the car to render the remainder of the system inoperative to a thief.

This of course adds significantly to the cost of the product and is inconvenient to the user.

The invention relates to devices with an anti theft design, and which can be implemented with low cost and with low inconvenience to the user.

BRIEF SUMMARY OF THE INVENTION

According to the invention, there is provided an electronic apparatus comprising:
  a main apparatus portion;
  a unique identification device for attachment in close proximity to the main apparatus portion, wherein the main apparatus portion has a processor adapted such that the function of the main apparatus portion is enabled only when in close proximity to the identification device,
  wherein the main apparatus portion comprises an interrogation system for interrogating the identification device, and
  wherein the identification device comprises an electronic device which is adapted to alter by detachment or attempted detachment such as to prevent the main apparatus portion function being enabled.

In this arrangement, the main apparatus portion is the normal electronic apparatus to be protected from theft. It is provided with an interrogation system so that it can be made to cease functioning if not in close proximity to the identification device.

This is suitable for electronic apparatus which remains stationary in use, and the identification device can be attached to a permanent structure in close proximity (such as a wall or floor).

The identification device can comprise an RFID sticker which is interrogated by the main apparatus portion in use. This provides a very low cost anti-theft solution and which requires no input by the user.

The invention can be used in an enormous range of products. Examples are in-car electronic devices, a home entertainment audio or audiovisual device, a school classroom electronic device, an office electronic device and factory equipment including all possible types of processing machinery.

This list is not exhaustive, and the invention can be applied to any apparatus which remains in the same place and has an electronic processor which can be controlled to disable the functioning of the device.

The device does not have to have one fixed location, and multiple tags can be supplied with the device to enable use of the device at more than one desired location. For example, if it is decided to move a product to a different location, another tag can be used.

BRIEF DESCRIPTION OF THE DRAWING

Examples of the invention will now be described with reference to the accompanying drawings, in which.

DETAILED DESCRIPTION OF THE INVENTION

The invention provides an electronic device which is designed so that it only functions when an identification tag is present, and the tag cannot be moved without being damaged. This damage can either prevent it being interrogated any longer, or else can result in an electronic update which can be used by the main processor in the device to disable the device function.

Figure 1:
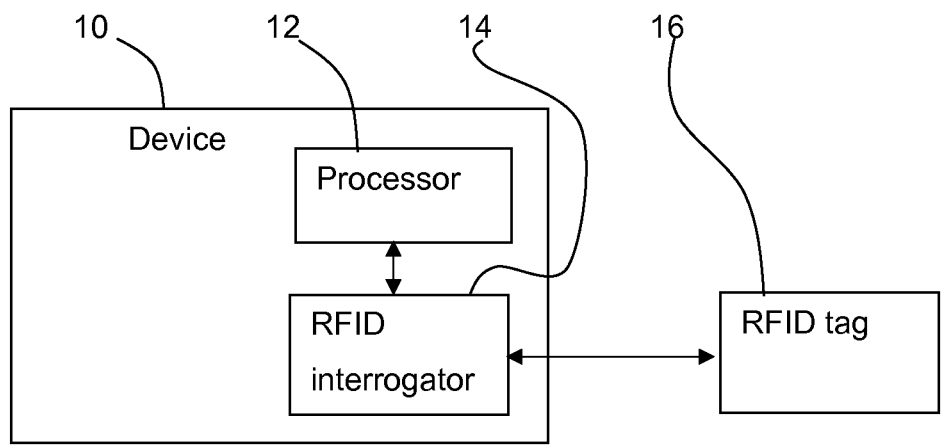
FIG. 1 shows an example of system of the invention.

FIG. 1 shows a first implementation of the invention.

The electronic apparatus comprises a device 10, which can be considered to be a main apparatus portion, and this is the normal device, for example TV, audio equipment, computer, computer peripheral, domestic appliance etc.

The device has a processor 12, and which controls the functioning of the device, in such a way that it is able to disable the operation of the device. The increasing use of microprocessors in electrical devices means that most electrical apparatus includes such a processor, so that the implementation of the disabling function is routine to those skilled in the art.

The apparatus has a unique identification device 16 in the form of an RFID tag for attachment in close proximity to the main apparatus portion. The device is ideally not moved in use, and the tag can thus be attached to a fixed structure in close proximity, such as a wall, ceiling, floor or other structure, or other heavy immoveable object (car seat, dashboard).

The device 10 has an interrogation system 14 provided as part of the main apparatus portion for interrogating the identification device such that the main apparatus portion is enabled only when in close proximity to the identification device. In the example shown, this comprises an RFID tag reader.

For a theft to provide a useful functioning device, the tag and the device are therefore needed. However, the identification device is adapted to be made disfunctional by detachment or attempted detachment from the surface to which it is attached.

For example, the identification device can comprise an RFID sticker which is interrogated by the main apparatus portion in use. This provides a very low cost anti-theft solution and which requires no input by the user.

The communication link between the device 10 and the tag 16 is a very short distance communications link.

Figure 2:
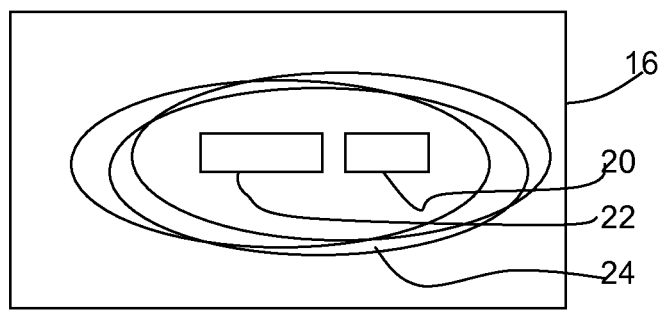
FIG. 2 shows a tag used in the system of FIG. 1.

The tag device 16 is shown in greater detail in FIG. 2, and includes an RFID chip 20 including a memory. The tag device may or may not require a battery 22. The device further comprises an antenna 24 in the form of an RFID coil, and the device is adapted to be made disfunctional by removal or attempted removal from the surface to which it is attached.

The device 16 can be an RFID vignette (sticker), which is designed such that attempted removal disconnects the antenna so that the device can no longer be interrogated.

Such vignettes exist in the field of road tolling (without RFID tags) and are being used by for example the Swiss and other road tax vignette systems. These tags cannot be peeled off from the place where they were attached without physical destruction, and the same basic technology can be applied in this case. The idea is to extend the functionality of such a tag with an RFID based function, so that the vignette contains the RFID function and the antennae coil printed on the tag.

When peeled off, the tag is broken and the antenna coil is destroyed. Another implementation is a blister type of arrangement, as proposed for the pharmaceutical industry. In this case, the RFID chip includes an input/output port which provides a signal only when the blister is ruptured. This rupture is detected as a short circuit or open circuit in tracks provided in the blister, and a signal is generated in response to this by a printed circuit battery. The battery capacity is very low (e.g. a capacitor) and is only drained when the rupture event happens, to generate the required signal to provide a signal to memory to indicate the rupture. This memory information can be used by the processor to disable the device.

The blister type arrangement can be implemented by providing tracks in the vignette. If the vignette is removed, the tracks are short circuited or broken (like the tracks on the blister if you take out a pill) and the event is notified by the integrated chip into the memory.

The invention can be used in an enormous range of products. Examples are:

in-car electronic devices. The tag can be attached to the vehicle dashboard or other internal surface, and can be used to protect the audio system, DVD system or any other apparatus that remains in the car.

a home entertainment audio or audiovisual device. Examples are televisions, DVD players/recorders, PCs and peripherals, domestic appliances and indeed any electronic devices in the home which remain fixed in position.

a school classroom electronic device. Examples may be electronic white boards, projectors, computers, screens, PCs etc.

an office electronic device. All office electronic equipment can be covered, including photocopiers, printers, PCs, servers etc.

factory equipment including all possible types of processing machinery.

This list is not exhaustive, and the invention can be applied to any apparatus which remains in the same place and has an electronic processor which can be controlled to disable the functioning of the device.

The device does not have to have one fixed location, and multiple tags can be supplied with the device to enable use of the device at more than one desired location. For example, if it is decided to move a product to a different location, another tag can be used.

In the example above, RF communication is used between the tag and the main device. However, this communication could be wired. For example, a sticker may be provided at the back of a TV for attachment to the wall behind at the end of a wire. The rupture mechanism could not then rely on damaging the RFID antenna, and a different mechanism, such as the blister approach where a signal is initiated by the rupture, could be used. Thus, the preferred RFID implementation is not the only possible solution within the scope of the invention.

The detailed implementation of the preferred RFID implementation of the invention will be routine to those skilled in the art of RFID devices and communication protocols.

RFID tags come in three general types; passive, active, or semi-passive (also known as battery-assisted). Passive tags require no internal power source, thus being pure passive devices. These are only active when a reader is nearby to power them, whereas semi-passive and active tags require a power source, usually a small battery.

Most passive tags signal by backscattering the carrier wave from the reader. This means that the antenna has to be designed both to collect power from the incoming signal and also to transmit the outbound backscatter signal.

To communicate, tags respond to queries generating signals that must not create interference with the readers, as arriving signals can be very weak.

Passive tags have practical read distances ranging from about 10 cm (ISO 14443) up to a few meters (Electronic Product Code (EPC) and ISO 18000-6), depending on the chosen radio frequency and antenna design/size. Due to their simplicity in design they are also suitable for manufacture with a printing process for the antennas. The lack of an onboard power supply means that the device can be quite small: commercially available products exist that can be embedded in a sticker which can be used in the present invention.

The tags are typically silicon semiconductor devices, although non-silicon tags made from polymer semiconductors are currently being developed by several companies.

Unlike passive RFID tags, active RFID tags have their own internal power source, which is used to power the integrated circuits and broadcast the signal to the reader. These can be used over longer distances, for example enabling the tag to be hidden from view. This acts as a further anti theft benefit. Active tags can have practical ranges of hundreds of meters, and a battery life of up to 10 years.

Semi-passive tags are similar to active tags in that they have their own power source, but the battery only powers the microchip and does not broadcast a signal. Thus, a longer battery life is possible. The RF energy is reflected back to the reader like a passive tag. An alternative use for the battery is to store energy from the reader to emit a response in the future, usually by means of backscattering.

The battery-assisted receive circuitry of semi-passive tags lead to greater sensitivity than passive tags, typically 100 times more. The enhanced sensitivity can be leveraged as increased range.

Different frequencies can be used in RFID tags, and a number of standards exist. Low-frequency (LF) passive tags typically operate in the range 124 KHz to 148 KHz, and these are normally inductively coupled using a hard copper coil as antenna. For high frequency tags, at 13.56 MHz, a planar spiral with 5-7 turns over a credit-card-sized form factor can be used to provide ranges of tens of centimeters. These coils are less costly to produce than LF coils, since they can be made using lithographic techniques rather than by wire winding.

Ultra-high frequency (UHF) and microwave passive tags are usually radiatively-coupled to the reader antenna and can employ conventional dipole-like antennas.

These various implementation possibilities can all be applied to the present invention, and the invention is not limited to any particular RFID technology. As explained above, the invention can also use other communication systems between the interrogation system and the identification tag.

Various modifications will be apparent to those skilled in the art.

The invention claimed is:

1. An electronic apparatus comprising:
   a main apparatus portion comprising a processor and an interrogation system;
   a unique identification device for attachment to a fixed structure that is in close proximity to the main apparatus portion,
   wherein the main apparatus portion is enabled only when in close proximity to the unique identification device, the interrogation system is configured to interrogate the unique identification device, and-the unique identification device comprises an antenna coil that is destroyed by either detachment or attempted detachment from the fixed structure such as to prevent the main apparatus portion from being enabled.

2. The apparatus as claimed in claim 1, wherein the interrogation system is wireless.

3. The apparatus as claimed in claim 1, wherein the unique identification device is passive.

4. The apparatus as claimed in claim 1, wherein the unique identification device comprises an RFID device which is interrogated by the main apparatus portion in use.

5. The apparatus as claimed in claim 4, wherein the identification device comprises an RFID sticker.

6. The apparatus as claimed in claim 1, wherein the main apparatus portion comprises one of an in-car electronic device, a home entertainment audio or audiovisual device, a school classroom electronic device, an office electronic device, and electronic factory equipment.

* * * * *